June 25, 1963 G. THIEBES 3,094,791
PICTURE BOOK
Filed April 20, 1961
FIG.1
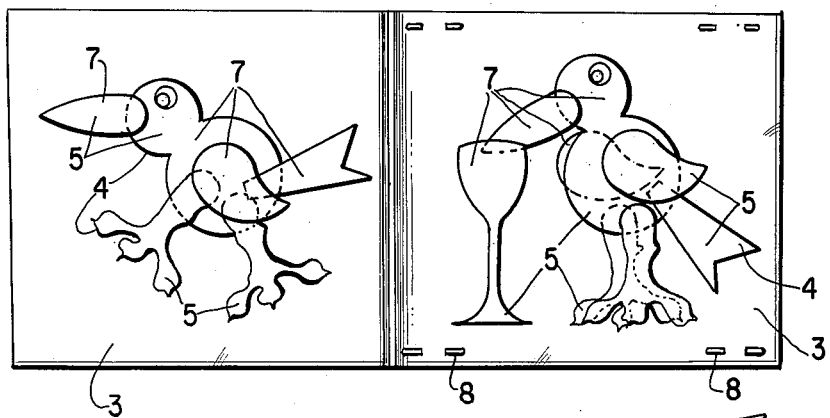
FIG.2
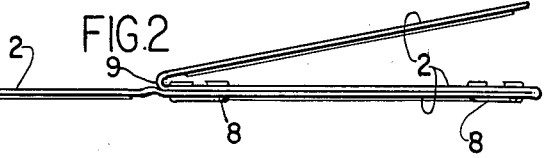
FIG.3
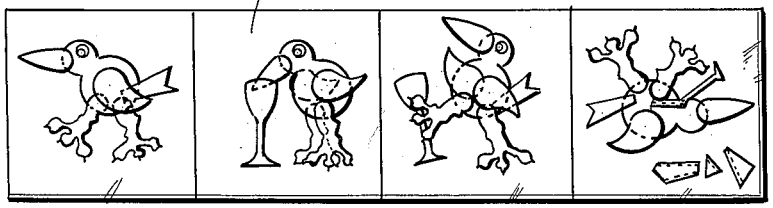
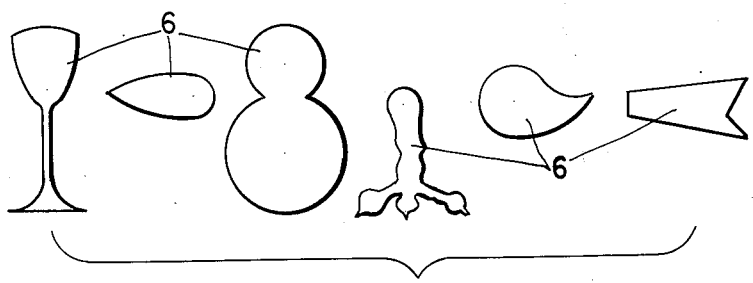
FIG.4
INVENTOR
GUNTER THIEBES
BY
Jacob L. Kollin
ATTORNEY

United States Patent Office 3,094,791
Patented June 25, 1963

3,094,791
PICTURE BOOK
Gunter Thiebes, Hagen, Westphalia, Germany, assignor to Westfaelische Verlagsanstalt Thiebes & Co., Hagen, Westphalia, Germany, a German company
Filed Apr. 20, 1961, Ser. No. 104,458
1 Claim. (Cl. 35—26)

The invention relates to a picture book. Picture books usually consist of folded sheets which are fastened and bound together with a binding cover. In another known embodiment of a picture book sheets of tear-resistant cardboard are folded in accordion-like fashion. The individual pages contain printed pictures and possibly legends arranged underneath these. It is also known to arrange a theme on two adjacent pages, so that one page is already executed in colors, while the adjacent one must be drawn by the child itself with colored pencils or water colors. Picture books of this kind, to be sure, are conducive to occupying a child, but they offer it no possibility or incentive for original creativity.

In addition, a possible injury with the pointed colored pencil and most certainly a greater or lesser amount of soiling when water colors are used, are possible.

The object of the above invention is to provide a picture book, in which the advantages of known embodiment forms will be retained, but whose disadvantages will be overcome.

This object is effected essentially by providing a picture book which comprises a strip folded accordion-like fashion into four sheets, wherein individual sides contain, for example, outline representations of the movements of a raven and which consist of individual pieces assembled in a conforming fashion distinct from one another and which may be made adherent by means of suitable, pre-cut self-adhesive colored paper pieces.

Due to this construction of the picture book, by which the child is stimulated into overlaying actions, the book is inexpensive to manufacture, since the strips containing the representations of motion may advantageously be imprinted in color all-around in two machine operations before being folded. Above all it is possible to manufacture the gummed cutouts or paste-ons which may serve for pasting all sides, always employing the same tool for manufacture. Furthermore, the form of the picture book excludes the danger of injury.

A further advantageous development resides in that the accordion-like folded inner sheets of the picture book may be secured to one another by means of one or more detachable clasps, adhesive tape or the like, not far from the upper or lower edges.

Through these measures the accordion-like folded strip of four sheets, for example, preserves the shape of a normal book. Above all the gummed cutouts or paste-ons which are used for pasting the marked representations of motion, are always accessible, prior to mounting, in an open pocket at the back of the book formed adjacent the upper and lower edges of fastened sheets.

A further advantage of the invention resides in that the picture book may also serve as a wall ornament after the releasing clasps and unfolding the sheets.

A feature of the invention is the provision of marked individual parts on which are shown written characters or other markings for the purpose of arranging the paste-ups in the proper respective order.

A further feature of the invention is the possibility of varying the sequence of the gummed cutouts or paste-ons to change the course of the pictorial motion.

Still another feature of the invention resides in the possibility of employing, as a material for the accordion-like folded strips, cardboard, pasteboard, colored plastic sheets or the like, the edges and corners of which may be reinforced in a known manner.

Finally, another feature of the invention resides in the provision of an open pocket originating between the inner attached sheets at the back of the book, which pocket may be closed by means of a detachable clasp or the like.

The gummed cutouts or paste-ons are thereby protected from loss by being kept in such a pocket.

In the accompanying drawing, which forms a part of this specification, there is shown, by way of example, a preferred embodiment of the invention.

In the drawing:

FIG. 1 is a view in elevation of the second and third sides of a picture book folded in accordion-like fashion;

FIG. 2 is a view of the book from above;

FIG. 3 is a view in elevation of the fully unfolded book, and

FIG. 4 shows some details of the book's construction.

Referring now to the drawing in the detail, the picture book comprises a strip 1, folded in accordion-like fashion, with four sheets 2, the sides 3 of which contain representations of a raven's movement characterized by marginal lines or outlines 4 of individual parts 5 assembled in an overlapping manner and deviating from one another. These representations are pasted on by means of self-adhering paste-ons or cutouts 6, of colored paper relative to individual parts 5, and in a sequence predetermined by means of FIG. 4. Only by changing the sequence can other directional representations be effected. The two middle sheets 2 are fastened together by means of detachable clasps 8, thus providing an open pocket at the back 9 of the book. The paste-ons or gummed cutouts are stored in this pocket.

Upon detaching clasps 8 from the sheet 2, the picture book may also be used as a wall ornament, as is apparent in FIG. 3.

Obviously, it is possible to additionally provide each side with legends or explanations.

I claim:

In a child's picture book, in combination, an elongated strip of material folded into a plurality of consecutive panels in accordion-like fashion each panel having thereon a plurality of sets of numbered outlines arranged in a predetermined overlapping relation, said sets of numbered outlines cooperating to show an animate object of nature in animated story-form of action, a plurality of sets of die-cut paper sections having top surfaces of varied colors, each of said sections of a set corresponding in size and shape to respective numbered outlines, said sections of each set being gummed on their lower surfaces and permanently secured to a respective panel.

References Cited in the file of this patent
UNITED STATES PATENTS

| | | |
|---|---|---|
| 1,562,225 | Garman | Nov. 17, 1925 |
| 2,201,479 | Davidson | May 21, 1940 |
| 2,460,221 | Gordon | Jan. 25, 1949 |
| 2,558,996 | Ullmann | July 3, 1951 |
| 2,592,078 | Taylor et al. | Apr. 8, 1952 |